United States Patent [19]

Tronich et al.

[11] Patent Number: 4,598,784
[45] Date of Patent: Jul. 8, 1986

[54] SHAFT-STEERED CONVEYOR APPLIANCE

[75] Inventors: Günter Tronich, Landshut; Martin Schmid, Niederhornbach, both of Fed. Rep. of Germany

[73] Assignee: Steinbock GmbH, Moosburg, Fed. Rep. of Germany

[21] Appl. No.: 692,362

[22] Filed: Jan. 16, 1985

[30] Foreign Application Priority Data

Jan. 25, 1984 [DE] Fed. Rep. of Germany ....... 3402495

[51] Int. Cl.$^4$ .............................................. B62D 51/04
[52] U.S. Cl. .................................................. 180/19.2
[58] Field of Search ................... 180/19.1, 19.2, 19.3, 180/209; 280/703, 755; 187/9 R

[56] References Cited

U.S. PATENT DOCUMENTS 2,864,453 12/1958 La Belle ........................... 180/24.02
3,537,715 11/1970 Gualdoni ............................ 280/703
4,186,813 2/1980 Burdick ............................. 180/19.2
4,393,959 7/1983 Acker ................................. 280/755

FOREIGN PATENT DOCUMENTS 1183813 12/1964 Fed. Rep. of Germany .
3106027 9/1982 Fed. Rep. of Germany .
788357 10/1935 France .
1539003 9/1968 France .
1589456 5/1981 United Kingdom .

Primary Examiner—John A. Pekar
Attorney, Agent, or Firm—Toren, McGeady, Stanger, Goldberg & Kiel

[57] ABSTRACT

In a pedestrian-controlled lift truck or stacker, a spring mounted drive wheel is provided between two laterally arranged support wheels. The initial stress on the spring, which determine the ground pressure, is increased on actuation of a brake.

13 Claims, 6 Drawing Figures

SHAFT-STEERED CONVEYOR APPLIANCE

The invention relates to a shaft-steered conveyor appliance, especially a pedestrian-controlled lift truck or stacker, in which a drive wheel steerable by the shaft and especially driven by a hub motor is arranged between two lateral support wheels, the drive wheel is pressed into ground engagement by spring means and the initial stress of the spring means is variable by an initial stress device in dependance upon an operational parameter.

Such a conveyor appliance is known from Fed. German Publ. Spec. No. 31 06 027. In the known apparatus with increasing load value a reduction of the ground contact pressure is effected. Further, with increasing lifting height of the load carrier a reduction of the ground contact pressure is brought about. In this way it is intended to ensure that the stability of the conveyor appliance against a tendency to tip is improved. It has appeared that the known apparatus does not work optimally under all operating conditions. Thus especially it proves inexpedient that the ground contact pressure is at the greatest when the conveyor appliance is unloaded. This signifies that when the appliance is unloaded the steering is heavy for the operator, without any other recognisable advantage being achieved. It is further to be borne in mind that the braking is effected primarily on the steerable drive wheel, for as a rule this wheel is best adapted for the braking action as a result of its larger diameter compared with the lateral support wheels and any other support wheels, such as those beneath the lift fork. If now however the ground contact pressure decreases with increasing load and with increasing lift height, then the effectiveness of the braking, which is of course dependent upon the ground contact, can be rendered doubtful under heavy load and/or great lift height.

The invention is based upon the problem, in a conveyor appliance of this classification, of ensuring that the advantage of easy steerability for the operator, arising from the low ground contact pressure, is guaranteed whenever a high ground contact pressure is not specifically required on the basis of other considerations. Moreover the ground contact pressure necessary for the transmission of the braking force to the ground is in any case to be guaranteed in braking.

In accordance with the invention spring means press the drive wheel into ground engagement and the initial stress of the spring means is variable in dependence on a braking operation initator signal.

A further, relatively rare situation in which a high ground contact pressure is necessary and the more difficult steerability therefore has to be accepted occurs in travel uphill where the initial stress of the spring means is variable based on the gradient of the roadway.

The drive moment of the drive motor is a measure for the inclination which must be overcome by the conveyor appliance. However this drive moment can also be increased in dependence for example upon a towed load coupled to the conveyor appliance. Such a towed load can also result in the necessity of increasing the ground contact pressure. The adjustment of the initial stress based on the load moment of the drive motor of the drive wheel therefore constitutes a preferred possibility of ascertaining a track inclination and other situations in which an increased ground contact pressure is required.

It is also conceivable that an increased ground contact pressure is desired in order to guarantee stable travel behaviour, on account of slippery, such as damp, ground.

Finally in order to take consideration of situations which the operator can best perceive, the initial stress can be varied by the operator.

It has appeared that in many cases it is sufficient if one effects a variation of the spring initial stress only by steps. This leads to a considerable simplification of the means for regulation of the spring initial stress.

Of course in the solution according to the invention no improvement of the steering behaviour and the braking behaviour is sought at the expense of stability. It has however appeared that the problems of stability can in many cases be solved without recourse to the initial stress of the spring means, for example by appropriate spacing of the support wheels.

The possibility of setting an initial increased spring stress by hand is advantageous for example when one is travelling briefly over uneven terrain and an increased torque must be applied to the track in order to travel over swells in the ground. The operator can easily recognise such swells in the ground.

The invention is explained by reference to examples of embodiment by the accompanying Figures, wherein:

FIGS. 1 and 2 show a pedestrian-guided electric stacker with central drive.

The steerable drive wheel 1 is mounted in the vehicle chassis with spring action in the vertical direction. The two lateral support wheels 2 are formed as casters with axis of rotation trailing in relation to the pivot axis. They are secured rigidly in the vertical direction in the vehicle chassis.

Figure 1:
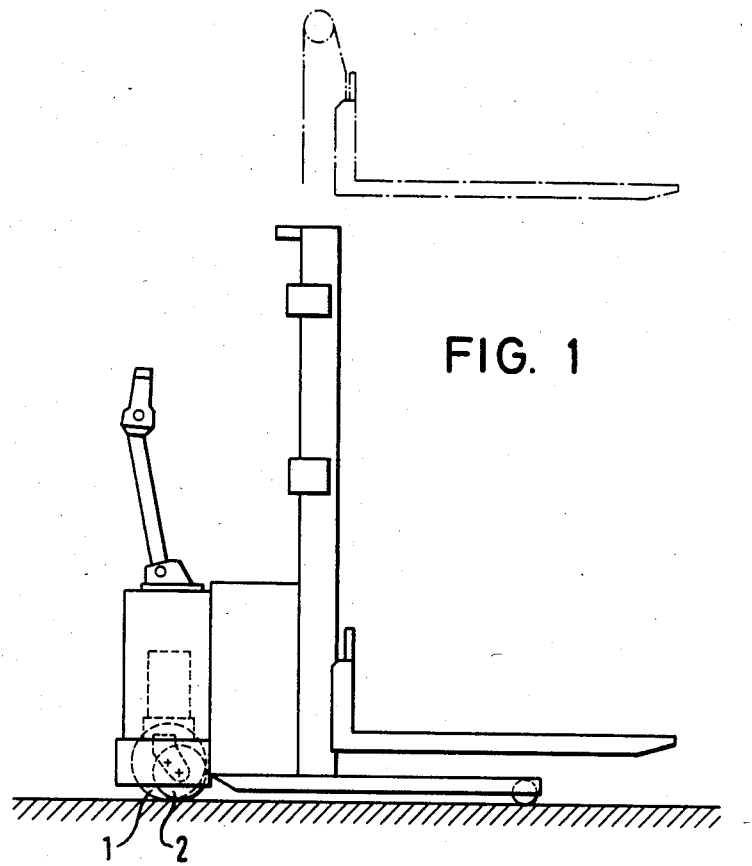
FIG. 1 shows a lateral elevation of a conveyor appliance in accordance with the invention, namely a pedestrian-controlled stacker.
Figure 2:
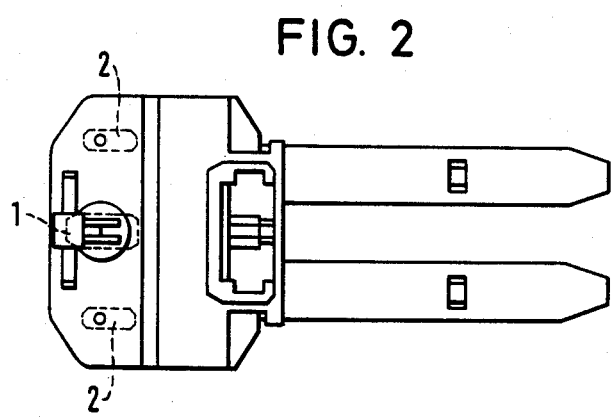
FIG. 2 shows a plan view of the pedestrian-controlled stacker according to FIG. 1.
Figure 3:
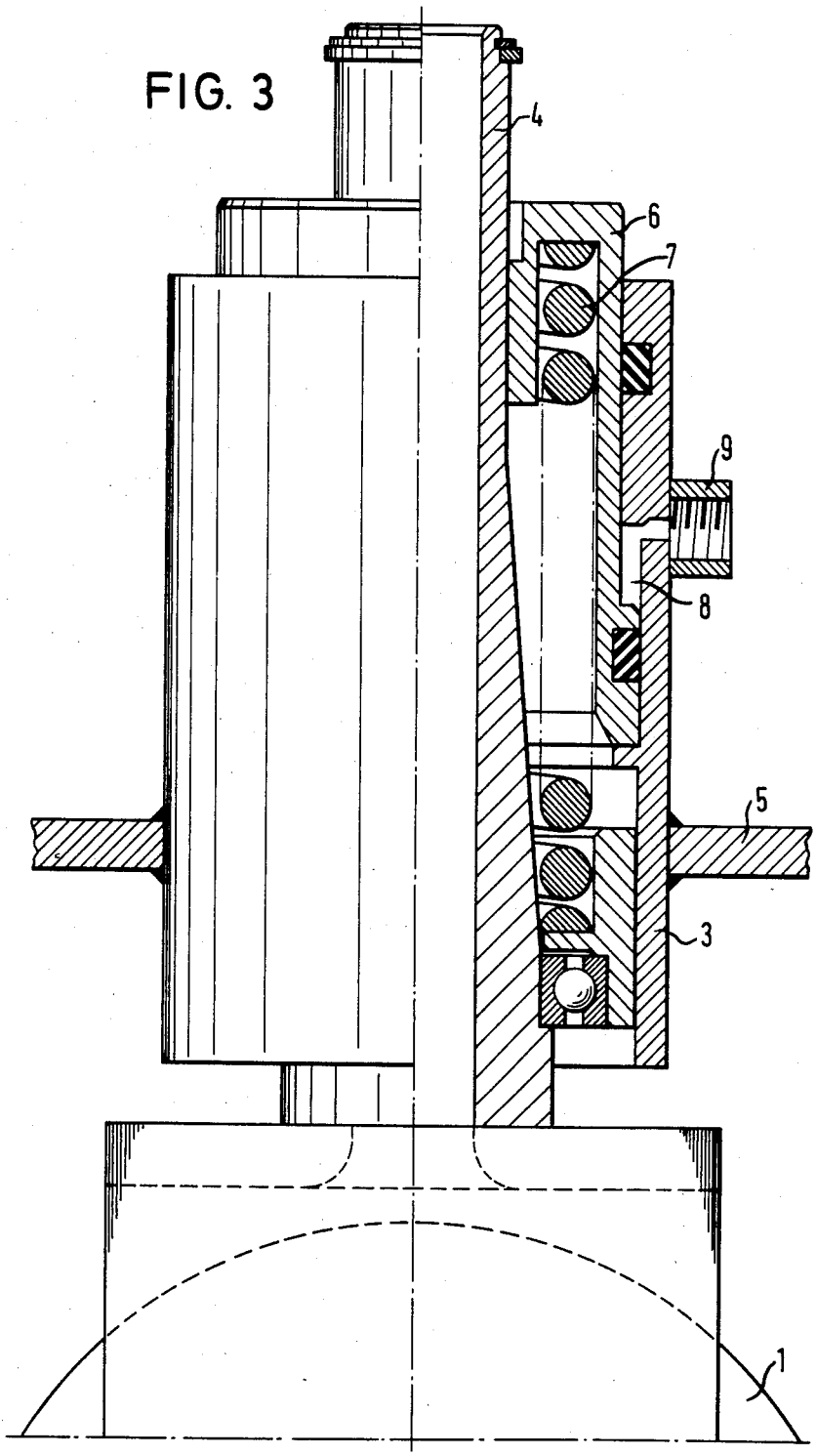
FIG. 3 shows the wheel assemblage with the driven wheel in the pedestrian-controlled stacker according to FIGS. 1 and 2.

FIG. 3 shows the mounting of the steerable drive wheel with hub drive in the vehicle chassis.

The mounting position 3 for the steering shaft 4 of the drive wheel 1 is connected through the chassis part 5 with the drive part of the vehicle chassis. In the upper part the mounting position 3 is formed as a hydraulic cylinder as an initial-stressing device. This device accommodates as a piston a displaceable upper support mounting 6 for the spring 7. The installation space for the spring 7 can be reduced in height by filling of the cylinder chamber 8 with oil under pressure through the connector 9.

Figure 4:
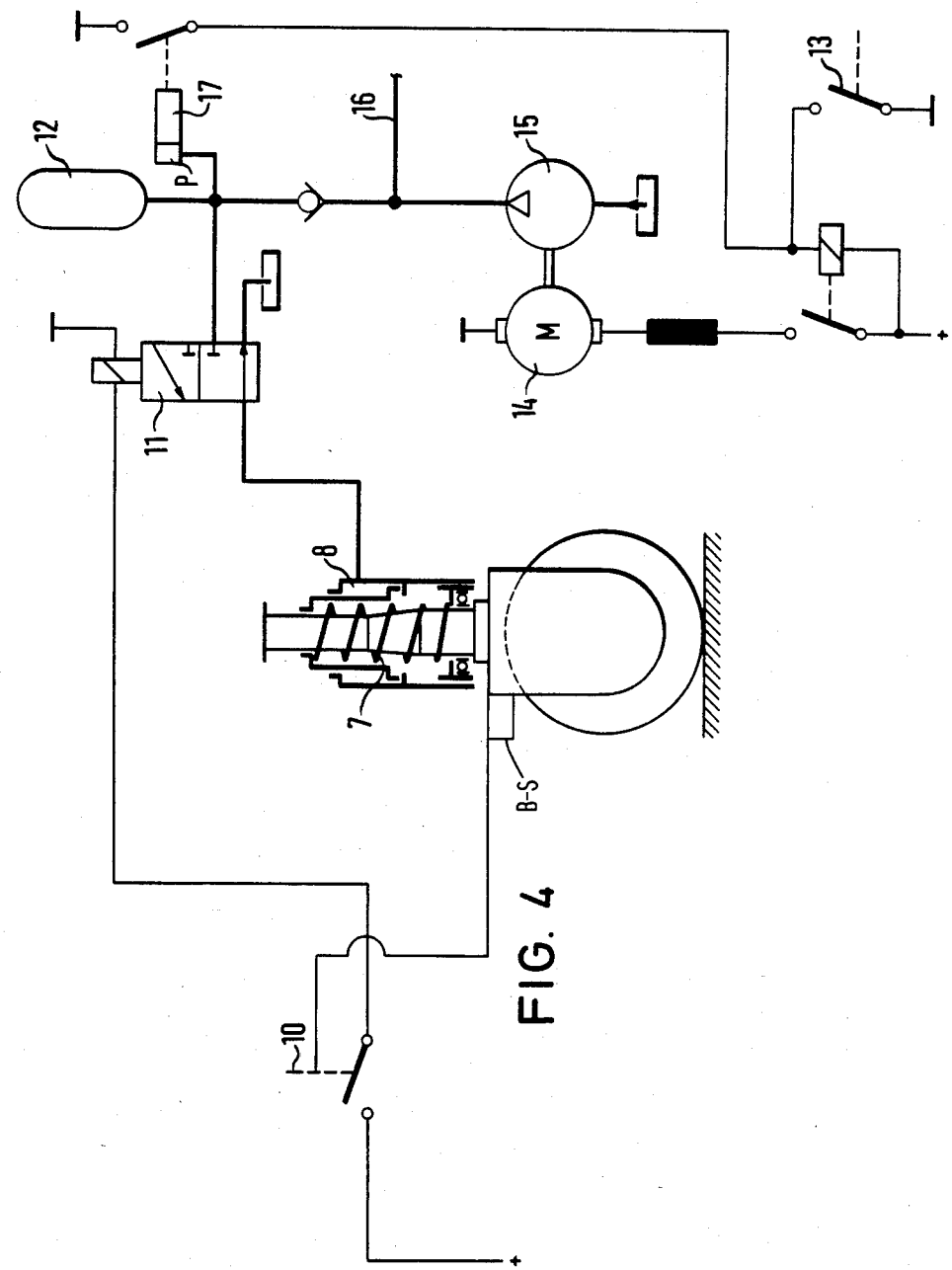
FIG. 4 shows the circuit diagram for the regulation of the spring initial stress in dependence upon the brake actuation.

FIG. 4 shows the circuit arrangement for the automatic increase of the initial stress of the spring 7 on actuation of the brake-setting parts B-S.

The switch 10 is in operating connection with the brake-setting parts B-S of the vehicle. On application of the brakes the switch 10 is closed, the valve 11 is opened electro-magnetically so that the hydraulic accumulator 12 supplies the cylinder chamber 8 with oil under pressure, whereby the installation space of the spring 7 is shortened. On termination of the braking action the switch 10 is opened and the cylinder chamber 8 is emptied again.

The switch 13 is a component of the hydraulic lift installation of the vehicle and is in operative connection with this installation in such a way that it is closed at every actuation of the setting part for the lifting of the load-carrier. Thus the motor 14 for the hydraulic lifting system and the hydraulic pump 15—likewise components of the hydraulic lift installation of the vehicle—are set in operation, so that as well as the hoisting of the load-carrier the pressure accumulator 12 is replenished also at every lifting operation. The conduit 16 leads to the hydraulic lift installation of the vehicle.

If in the case of a lengthy journey with repeated braking and thus filling of the cylinder chamber 8 the hydraulic accumulator 12 is emptied to such extent that the filling pressure drops below the intended limit, the pressure-dependent switch member 17 will set the hydraulic pump 15 of the hydraulic lift installation in operation and refill the accumulator 12.

Figure 5:
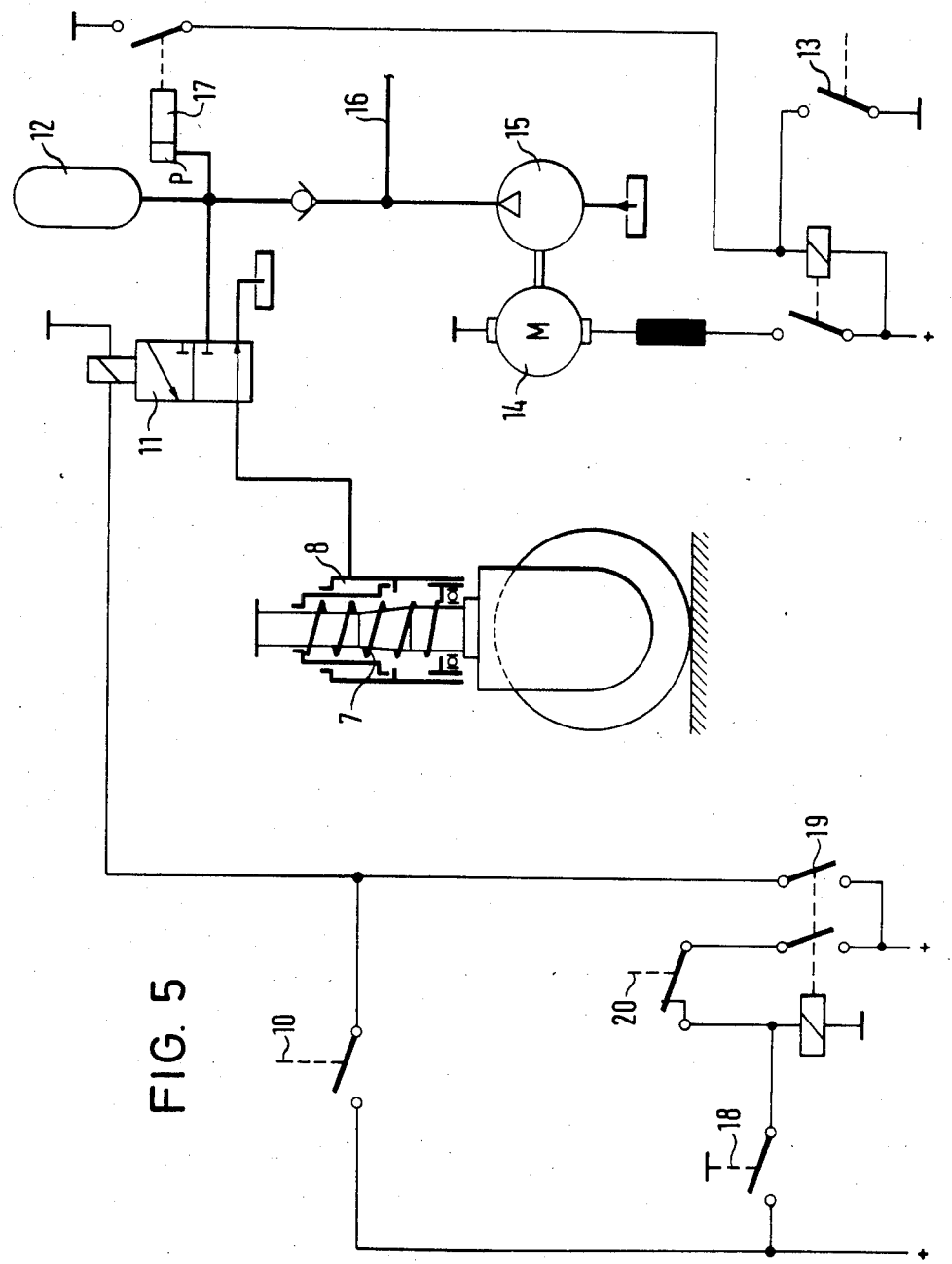
FIG. 5 shows the circuit diagram according to FIG. 4 supplemented by a manual control of the initial spring stress by the operator.

FIG. 5 shows the circuit arrangement when the possibility is additionally available of the pedestrian operator increasing the initial stress of the spring element by key operation.

On operation of the key 18 the valve 11 is opened through the switch member 19 and thus the spring element 7 is more strongly initially stressed, that is the wheel pressure is increased. It is conceivable for the filling of the cylinder chamber 8 to be varied by the duration of key operation and thus a continuously variable increase of wheel pressure to be made possible.

The switch member 20 is in operative connection with the hydraulic lift system of the vehicle in such a way that it is opened on every actuation of the setting member for the lowering of the load-carrier. Thus opening of the switch member 19 takes place and consequently emptying of the cylinder chamber 8. In this way the increased wheel pressure is automatically reduced at every setting down of the load, if it has not already previously been set back for example by liberation of the brake linkage.

Figure 6:
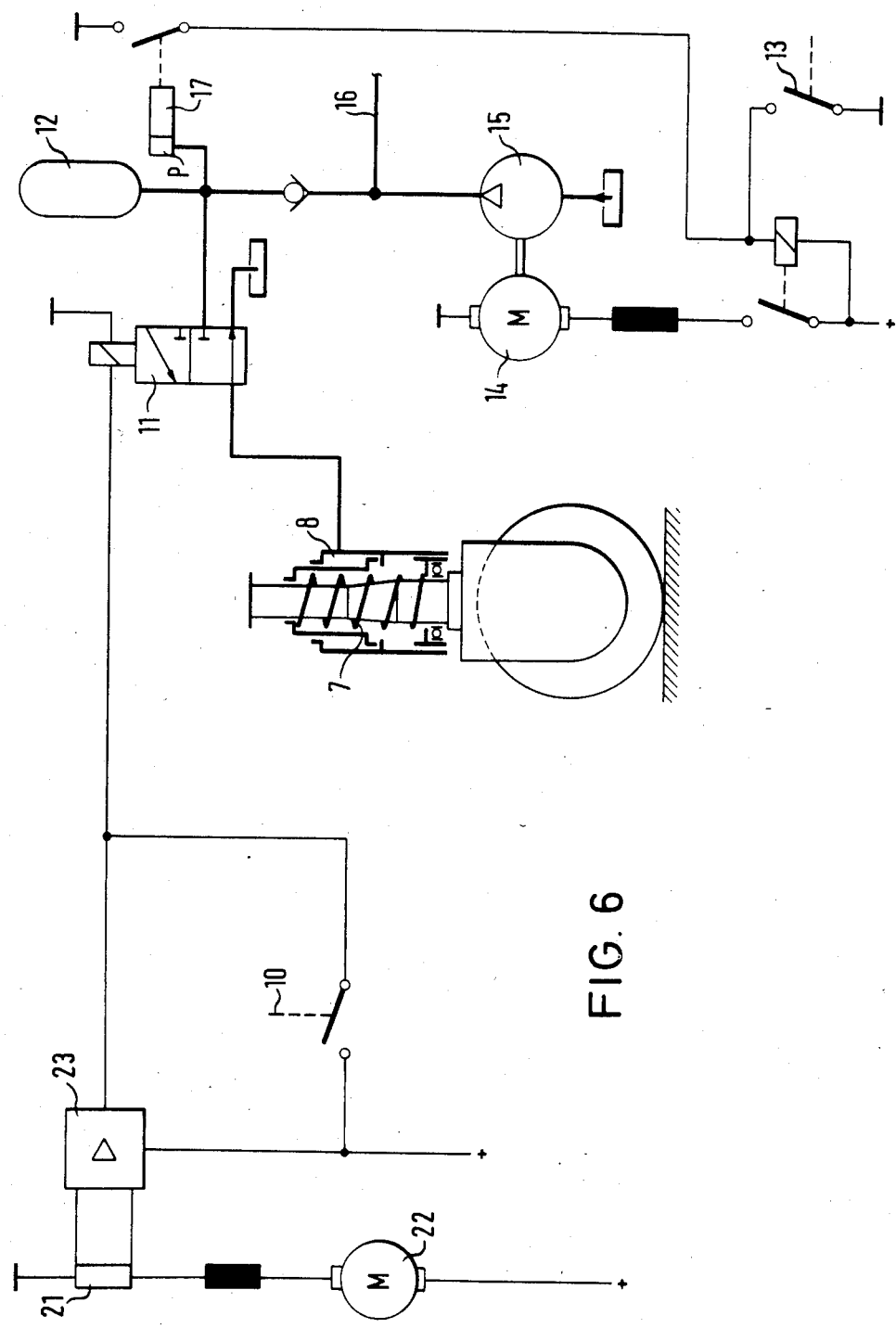
FIG. 6 shows the circuit diagram according to FIG. 4 supplemented by influencing of the initial spring stress in dependence upon the power consumption of the drive motor for the drive wheel.

FIG. 6 shows the circuit arrangement for increasing the wheel pressure in the case of high current in the drive motor circuit (in the case of uphill travel and travel over obstacles).

The shunt 21 lies in the current circuit of the vehicle drive motor 22. When a pre-determined drive force, that is current intensity of the drive motor, is exceeded, the current circuit to the valve 11 is closed by the switch member 23, for example an amplifier with transistors, and thus the cylinder chamber 8 is filled. On regression of the current intensity below the pre-determined value the switch member 23 effects the setting back and thus withdrawal of the wheel pressure increase.

We claim:

1. Shaft-steered conveyor appliance, in the form of a pedestrian-controlled lift tank or stacker, in which a hub-motor-driven drive wheel steerable by a shaft is arranged between two lateral support wheels, the drive wheel is pressed into ground engagement by spring means and the initial stress of the spring means is variable by an initial-stressing device in dependence upon an operational parameter, said initial-stressing device includes said spring means (7), adjusting means (6) for the initial stressing of the spring means (7), control means (10, 11, 12) for said adjusting means (6) and braking means in operative connection with said control means (10, 11, 12), said adjusting means (6) being variable in dependence upon the application of the braking action.

2. Shaft-steered conveyor appliance according to claim 1, characterised in that the initial stress of the spring means (7) is further variable in dependence upon the gradient of the roadway.

3. Shaft-steered conveyor appliance according to claim 2, characterised in that in the case of an electric drive motor (22) for the drive wheel (1), a measuring sensor (21, 23) for detecting the consumed electric power lies in the current supply of this electric drive motor (22) and in that this measuring sensor (21, 23) controls the initial-stressing device (6 to 9).

4. Shaft-steered conveyor appliance according to claim 1 or 2, characterised in that the initial stress of the spring means (7) is in addition variable in dependence upon the load moment of the drive motor (22) of the drive wheel (1).

5. Shaft-steered conveyor appliance according to claim 1, characterised in that the initial stress of the spring means (7) is further variable in dependence upon the nature of the ground.

6. Shaft-steered conveyor appliance according to claim 5, characterised in that the initial-stressing device (6 to 9) is controlled by a ground nature sensor.

7. Shaft-steered conveyor appliance especially according to claim 1, characterised in that the initial stress of the spring means (7) is further variable by a deliberate signal triggerable by an operator.

8. Shaft-steered conveyor appliance according to claim 7, characterised in that the initial-stressing device (6 to 9) is controlled by a manually actuated switch (18).

9. Shaft-steered conveyor appliance according to claim 1, characterised in that the spring means (7) are supported at one end on a displaceable support mounting (6) of the initial-stressing device (6 to 9) and at the other end act upon the drive wheel (1) and in that the support mounting (6) is adjustable by a fluid-controlled, hydraulic, adjusting device (8, 9).

10. Shaft-steered conveyor appliance according to claim 9, characterised in that the adjusting device (8, 9) possesses at least two setting stages.

11. Shaft-steered conveyor appliance according to claim 10, characterised in that the adjusting device (8, 9) comprises a piston-cylinder unit including a working chamber (8) selectively connectable with one of a high-pressure supply (12) or a low-pressure supply, through a valve (11) actuatable in dependence upon the operational parameter concerned in each case.

12. Shaft-steered conveyor appliance according to claim 11, characterised in that the high-pressure accumulator (12) is fillable by means of a pump (15) which can be set in action by one of a pressure sensor (17) and by actions occurring in regular repetition during operation.

13. Shaft-steered conveyor appliance, in the form of a pedestrian-controlled lift truck or stacker, in which a hub-motor-driven drive wheel steerable by a shaft is arranged between two lateral support wheels, the drive wheel is pressed into ground engagement by spring means and the initial sress of the spring means is variable by an initial-stressing device in dependence on an operational parameter, said initial-stressing device includes said spring means (7), and means for the initial stressing of said spring means being variable in dependence upon the load moment of a drive motor (22) of the drive wheel (1) braking means for said drive wheel, load sensing means on said drive motor, and said means for initially stressing said spring means includes control means in operative connection with said load sensing means on said drive motor.

* * * * *